Figure 1:
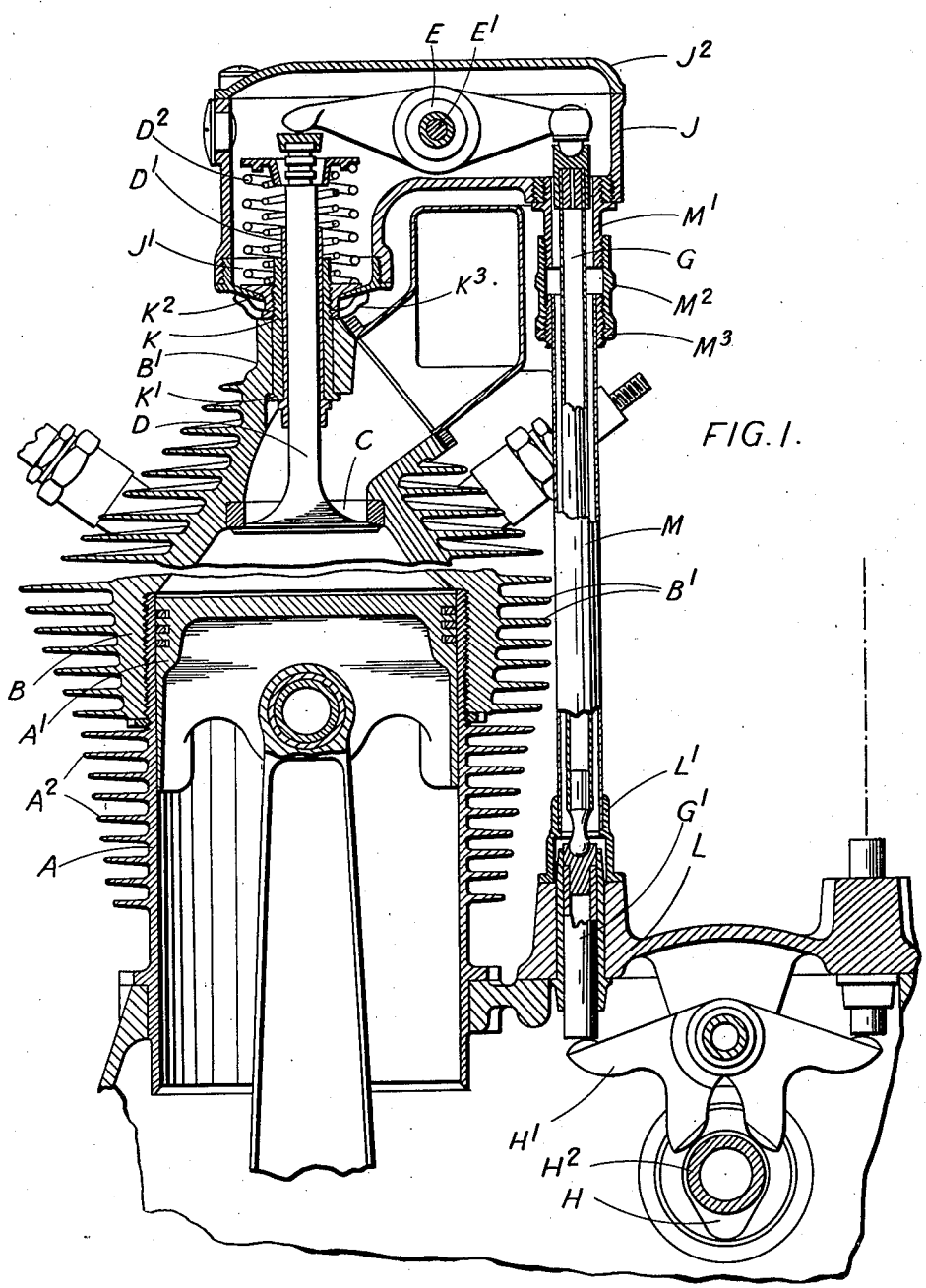

Patented July 16, 1929.

1,721,341

UNITED STATES PATENT OFFICE.

FRANK BERNARD HALFORD, OF LONDON, ENGLAND.

VALVE GEAR FOR INTERNAL-COMBUSTION ENGINES.

Application filed April 23, 1928, Serial No. 272,126, and in Great Britain December 13, 1927.

This invention relates to valve gear for internal combustion engines of the air-cooled type having overhead valves operated through rockers acted upon by push rods, and has for its object to provide an improved construction of valve gear for such engines of the kind in which the tendency for the timing of the valves to be adversely affected due to the different expansion of certain parts when the engine heats up is reduced or prevented by mounting each valve rocker on a supporting member one end of which is connected to the cylinder head so as to be capable of a slight rocking movement relatively thereto while the other end is connected to some other part of the engine by an adustable tie rod.

According to the present invention one part of the rocker supporting member is anchored to the cylinder head by means concentric with the valve stem, with curved surfaces between the engaging parts of the anchorage so as to permit movement of the anchored part of the supporting member relative to the cylinder head while another part of the rocker support is connected to the cylinder or crank case by means of one or more tie rods adjustable in length.

Preferably the rocker support is formed as a casing enclosing the rocker or rockers and the upper ends of the associated valve stems while the tie rods are tubular and serve as housings for the push rods. With such an arrangement the rocker supporting casing is conveniently formed oil-tight and makes substantially oil-tight joints both with the anchorage and with the tubular tie rods which in turn make oil-tight joints with the crank case so as completely to enclose the valve gear within an oil-tight chamber and thus prevent the entry of dust or other foreign matter.

The means for anchoring the desired part of the rocker supporting member or casing to the cylinder head conveniently, comprises a hollow bolt passing through the thickened portion of the cylinder head surrounding the valve stem and either constituting the valve guide or serving in effect as a tubular socket within which the valve guide is carried. The upper end of this tubular bolt is screwthreaded and is engaged by a nut either itself having a curved thrust surface or acting on a washer member having such a curved thrust surface which engages a correspondingly curved surface on a part carried by or formed integral with the portion of the rocker supporting member or casing surrounding the valve stem. In this way this part of the rocker supporting member or casing is anchored to the cylinder head, the curved surfaces of the nut or the washer member on which it acts and the part which this nut or washer member engages enabling the supporting member or casing to rock slightly relatively to the cylinder head. The head of the tubular bolt is conveniently formed as a flange which bears against the interior surface of the portion of the cylinder head surrounding the valve guide so that this tubular bolt is capable of withstanding considerable stresses and can thus anchor the desired part of the rocker supporting member or casing to the cylinder head in a manner capable of withstanding the stresses set up during the operation of the valves.

Either a separate rocker supporting member or casing may be provided for each valve or two or more valves may be operated by rockers carried by a single rocker supporting member or casing.

Figure 2:
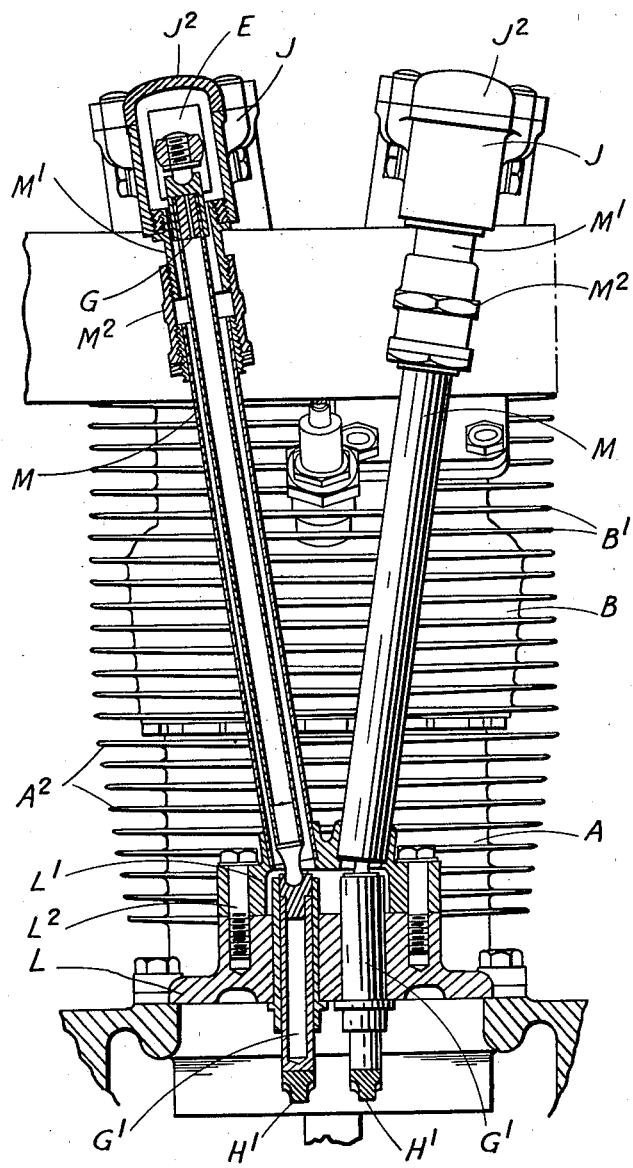

The invention may be carried into practice in various ways and may be applied to engines of which the valve axes are either inclined or parallel to the cylinder axes and one construction according to this invention as applied to an engine having the axes of its valves inclined to the cylinder axes is illustrated by way of example in the accompanying drawings, in which Figure 1 is a sectional elevation of a cylinder and valve operating mechanism according to this invention looking in one direction, and Figure 2 is an elevation also partly in section of the arrangement shown in Figure 1 looking in a direction at right angles to that of Figure 1.

In the construction illustrated which may be taken as part of a multi-cylinder internal combustion engine having one or more rows of air-cooled cylinders, each cylinder comprises for example a steel or cast iron barrel A containing a piston $A^1$ and provided with cooling fins $A^2$, and an aluminium or aluminium alloy cylinder head B screwed thereon and also provided with cooling fins $B^1$. Formed in each cylinder head are inlet and exhaust ports one of which, C, appears in Figure 1, each port being controlled by a poppet valve D having its axis inclined to that of the cylinder.

For the sake of clearness the section of the valve and valve operating mechanism in Figure 1 is taken through the axis of the valve, the section of the cylinder barrel and the lower portion of the cylinder head being taken through the cylinder axis.

Each valve D is acted upon by one end of a rocker E pivoted at $E^1$ and engaged at its other end by a push rod G acted upon at its lower end by a tappet $G^1$ operated either directly or through a rocker $H^1$ by a cam H on a camshaft $H^2$ conveniently arranged parallel to the engine crankshaft and driven therefrom by gearing in known manner.

The pivot $E^1$ of each valve rocker is carried at its ends by a support formed as a casing J of substantially L-section, as shown in Figure 1, one stroke of the L being arranged vertically to enclose the upper end of the valve stem while the other stroke is arranged horizontally to enclose the valve rocker E.

Either each rocker may be mounted in a separate rocker supporting casing as shown or two or more rockers may be mounted in a single casing. With either arrangement the portion of the casing J which encloses the upper end of the valve stem conveniently has screwed or otherwise secured to its lower end, as shown, a cup-like part $J^1$ having an inner concave surface. Through a suitable hole in this curved surface passes the stem of a hollow bolt K which passes also through the thickened part $B^1$ of the cylinder head surrounding the valve spindle and serves as a supporting socket for a valve guide $D^1$, this bolt K being provided with a head $K^1$ in the form of a flange bearing against the inner surface of the gas passage C in the cylinder head as shown. The upper end of the tubular bolt K which lies within the rocker supporting casing J is screwthreaded and carries a nut $K^2$ having a curved lower surface which corresponds to and engages the concave inner surface of the cup-like part $J^1$ and thus serves to anchor this part and hence the adjacent end of the casing J to the cylinder head.

The lower convex face of the cup-like part $J^1$ conveniently engages a cup-shaped spring washer $K^3$ surrounding the tubular part K and having its convex face in contact with the cylinder head.

The part of each rocker supporting casing J remote from its associated valve is connected to the crank case L of the engine by means of a tubular tie rod M serving also as a housing for the push rod G acting on the rocker E in such rocker supporting casing. The tubular tie rod M is adjustable in length and to this end conveniently comprises two parts M, $M^1$, the part $M^1$ being screwed into the casing J or a member connected thereto while the part M is brazed or otherwise rigidly connected to a member $L^1$ connected to the crank case L by bolts $L^2$. The adjacent ends of the parts M $M^1$ are oppositely screwthreaded or carry oppositely screwthreaded members, these screwthreaded parts being connected together by a common nut member $M^2$ so that by rotating this nut the effective length of the tie rod can be varied. A locking nut $M^3$ for the nut $M^2$ is conveniently provided to retain the nut $M^2$ in its position of adjustment.

In the arrangement shown, the tubular tie rods M associated with the operating mechanism of the two valves in a cylinder head engage a common member $L^1$ on the crank case. If desired, however, each of these tie rods may engage a separate member on the crank case.

The casing J is preferably provided with a removable cover $J^2$ for the purpose of facilitating assembly and inspection or adjustment of the valve gear.

It will be seen that with the arrangement illustrated the tubular tie rods M $M^1$ makes an oil-tight joint both with the rocker supporting casing J and with the member $L^1$ while the casing J is itself oil-tight and makes an oil-tight joint with the nut $K^2$ on the bolt K so that the whole valve gear is enclosed in an oil-tight manner and the entry of dust or other foreign matter is thus prevented.

As shown, the nut $K^2$ conveniently acts as a thrust member for a valve spring or springs $D^2$ so that the thrust of these springs tends to prevent this nut unscrewing. This thrust also counteracts to some extent the force exerted on the tubular bolt K by the casing J during operation of the valve.

In operation there will be a tendency for slight angular movement to take place between the casing J and the tubular tie rods M $M^1$. In the construction illustrated wherein these parts are rigidly connected together the tubular tie rods will bend to allow for this. In some cases, however, the connection between the upper ends of the tubular tie rods and the casing J may be such as to permit slight relative angular movement.

It is to be understood that although the invention has been described with particular reference to an arrangement in which tubular tie rods surrounding the push rods are employed, plain tie rods which do not enclose the push rods may be employed if desired and other details of construction may be varied within wide limits without departing from this invention. Further, the metals of which the various parts of the valve gear are formed may be varied according to the characteristics of the engine so as to obtain the desired compensation for the different expansion of different parts when the engine heats up. Thus, for example, the tie rods may be made of a metal having a different coefficient of expansion from the push rods, the metals being chosen so as to effect the desired result.

It will be seen that the arrangement according to this invention not only provides means whereby the timing of the valve gear will tend not to be adversely affected owing to the different expansion of certain parts when the engine heats up but also enables the rocker supporting member or casing to be anchored to the cylinder head in a simple manner, the anchorage being able to withstand considerable stresses and not necessitating the provision of special lugs or bolts on the cylinder head since either the valve guide itself or a tubular sleeve or bolt surrounding the valve guide can constitute the anchoring member connecting the rocker supporting member or casing to the cylinder head. Further, since the portion of the cylinder head through which the valve guide passes would normally be thickened, this part is well able to withstand any strains set up in operation and to form a rigid mounting for the tubular anchoring bolt. Again, the means for compensating for the different expansion of different parts can be combined in a simple manner with a casing or housing completely enclosing the valve operating mechanism.

What I claim as my invention and desire to secure by Letters Patent is:—

1. Valve operating mechanism for an internal combustion engine including in combination a cylinder, a valve in the head of said cylinder, a rocker one end of which acts on the valve, a push rod acting on the other end of the rocker, a pivot for the rocker, a supporting member for the pivot, a member concentric with the valve stem serving to anchor one part of the pivot support to the cylinder head with curved surfaces between the anchoring member and the part with which it engages so as to permit movement of the anchored part of the pivot support relatively to the cylinder head, at least one tie rod serving to connect another part of the pivot support to a fixed part of the engine, and means for adjusting the effective length of each tie rod.

2. Valve operating mechanism for an internal combustion engine including in combination a cylinder, a valve in the head of said cylinder, a rocker one end of which acts on the valve, a push rod acting on the other end of the rocker, a pivot for the rocker, a casing enclosing the rocker and the upper end of the valve stem and constituting a support for the pivot, a member concentric with the valve stem serving to anchor the part of the casing surrounding said stem to the cylinder head with curved surfaces between the anchoring member and the part with which it engages so as to permit movement of such part of the casing relatively to the cylinder head, at least one tie rod serving to connect a part of the casing adjacent to the point where the push rod enters it to a fixed part of the engine, and means for adjusting the effective length of each tie rod.

3. Valve operating mechanism for an internal combustion engine including in combination a cylinder, a valve in the head of said cylinder, a rocker one end of which acts on the valve, a push rod acting on the other end of the rocker, a pivot for the rocker, a support for the pivot, a tubular member concentric with the valve stem secured within a bore in the cylinder head at its lower end and screwthreaded at its upper end, a nut engaging the upper end of this tubular member and serving to anchor a part of the pivot support to the cylinder head with curved surfaces between the nut and the part which it anchors so as to permit movement of the anchored part relatively to the cylinder head, at least one tie rod serving to connect another part of the pivot support to a fixed part of the engine, and means for adjusting the effective length of each tie rod.

4. Valve operating mechanism for an internal combustion engine including in combination a cylinder, a valve in the head of said cylinder, a rocker one end of which acts on the valve, a push rod acting on the other end of the rocker, a pivot for the rocker, a support for the pivot including a part which surrounds the valve stem, a tubular member concentric with the valve stem secured within a bore in the cylinder head at its lower end and screwthreaded at its upper end which extends within the part of the rocker pivot support surrounding the valve stem, a nut engaging the screwthreaded upper end of the tubular member and engaging the adjacent part of the pivot support so as to anchor it to the cylinder head, the engaging surfaces of the nut and the pivot support being curved so as to permit movement of this part of the pivot support relatively to the cylinder head, at least one tie rod serving to connect a part of the pivot support adjacent to the push rod to a fixed part of the engine, and means for adjusting the effective length of the tie rod.

5. Valve operating mechanism for an internal combustion engine including in combination a cylinder, a valve in the head of said cylinder, a rocker one end of which acts on the valve, a push rod acting on the other end of the rocker, a pivot for the rocker, a casing enclosing the rocker and the upper end of the valve stem and constituting a support for the pivot, a tubular member concentric with the valve stem secured at its lower end within a bore in the cylinder head and screwthreaded at its upper end which extends into the pivot supporting casing, a nut engaging the screwthreaded upper end of the tubular member and engaging the adjacent part of the casing so as to anchor it to the cylinder head, the engaging surfaces of the nut and the casing being curved so as to permit movement of the casing relatively to the cylinder head, at least one tie rod serving to connect a part of the casing adjacent to the push rod to a fixed part of the engine, and means for adjusting the effective length of the tie rod.

6. Valve operating mechanism for an internal combustion engine including in combination a cylinder, a valve in the head of said cylinder, a rocker one end of which acts on the valve, a push rod acting on the other end of the rocker, a pivot for the rocker, a casing enclosing the rocker and the upper end of the valve stem and constituting a support for the pivot, a tubular member concentric with the valve stem secured at its lower end within a bore in the cylinder head and screwthreaded at its upper end which extends into the pivot supporting casing, a nut engaging the screwthreaded upper end of the tubular member and engaging the adjacent part of the casing so as to anchor it to the cylinder head, the engaging surfaces of the nut and the casing being curved so as to permit movement of the casing relatively to the cylinder head, a tubular tie rod enclosing the push rod and serving to connect the part of the casing adjacent thereto to a fixed part of the engine, and means for adjusting the effective length of the tie rod.

In testimony whereof I have signed my name to this specification.

FRANK BERNARD HALFORD.